United States Patent
Illbruck

Patent Number: 5,839,271
Date of Patent: Nov. 24, 1998

[54] QUENCH COOLER

[75] Inventor: Holger Illbruck, Waldshut-Tiengen, Germany

[73] Assignee: Asea Brown Boveri AG, Baden, Switzerland

[21] Appl. No.: 751,719

[22] Filed: Nov. 18, 1996

[30] Foreign Application Priority Data

Dec. 14, 1995 [DE] Germany .................. 195 46 726.4

[51] Int. Cl.⁶ ..................................... F02C 7/00
[52] U.S. Cl. .................... 60/39.59; 60/39.03; 261/98
[58] Field of Search .................. 60/39.05, 39.59, 60/39.83; 261/98, 116

[56] References Cited

U.S. PATENT DOCUMENTS

| | | | |
|---|---|---|---|
| 3,686,830 | 8/1972 | Huntington | 261/98 |
| 3,795,089 | 3/1974 | Reither | 261/116 |
| 4,394,142 | 7/1983 | Thimons et al. | 261/98 |
| 5,317,862 | 6/1994 | Rathbone | 60/39.59 |
| 5,579,631 | 12/1996 | Chen et al. | 60/39.05 |

FOREIGN PATENT DOCUMENTS

| | | |
|---|---|---|
| 0081996 | 6/1983 | European Pat. Off. |
| 3152299A1 | 3/1982 | Germany |
| 4142375A1 | 7/1993 | Germany |
| WO93/07372 | 4/1993 | WIPO |

*Primary Examiner*—Charles G. Freay
*Attorney, Agent, or Firm*—Burns, Doane, Swecker & Mathis, L.L.P.

[57] ABSTRACT

A quench cooler for cooling a hot flowing gas includes a cylindrical shell which is connected to a hot-gas line and to a cold-gas line and which has a device for injecting water. A packed column filling the cross-section of the shell through which flow occurs is arranged downstream of the water-injection device. The packed column is designed as a cartridge which can be pushed into the cylindrical shell and has a separate casing.

5 Claims, 1 Drawing Sheet

QUENCH COOLER

BACKGROUND OF THE INVENTION

1. Field of the Invention

The invention relates to a quench cooler for cooling a hot flowing gas, essentially comprising a cylindrical shell which is connected via a gas-inlet connection piece to a hot-gas line and via a gas-outlet connection piece to a cold-gas line and which has means for injecting water. It also relates to the use of such a quench cooler in an open gas-turbine plant.

2. Discussion of Background

Gas turbines of the modern generation and the top performance class work with very high turbine inlet temperatures, which makes cooling of the combustion chamber, the rotors and the blading absolutely essential. As a rule, highly compressed air is drawn off for this at the compressor outlet. Since a very high proportion of the compressed air is required for the modern conventional premix combustion, on the one hand only a minimum of cooling air remains for cooling purposes. On the other hand, this air intended for cooling is already very hot as a result of the compression, for which reason prior cooling of it is advisable.

Consequently, it is appropriate to recool the air by means of water injection, known per se (gas quenching). It is certainly true that the high-quality heat of the cooling air, the proportion of which may be up to 20 MW in modern machines, is only partly utilized with this method. However, a number of substantial advantages over convection coolers, which are also possible and which work on the basis of air/air or liquid/air heat exchange, are obtained with this solution.

SUMMARY OF THE INVENTION

Accordingly, one object of the invention is to provide a quench cooler of high efficiency for high gas and liquid temperatures and high pressures. The specific thermohydraulic requirement for this class of apparatus, if it is used in modern gas-turbine plants, is as follows: high gas-inlet temperature between 300°–530° C., high pressure on the gas side between 20 and 35 bar, small pressure losses on the gas and liquid side, and relatively high cooling range of the gas greater than 250° C.

According to the invention, this object is achieved in that a packed column filling the cross-section of the shell through which flow occurs is arranged downstream of the water-injection means. It is especially favorable if the packed column is designed as a cartridge which can be pushed into the cylindrical shell and has a separate casing. The advantage of this measure may be seen in particular in the compact, easy-to-maintain construction of the apparatus. This is especially important, since the space requirement can be a decisive factor during both set-up and maintenance.

BRIEF DESCRIPTION OF THE DRAWINGS

A more complete appreciation of the invention and many of the attendant advantages thereof will be readily obtained as the same becomes better understood by reference to the following detailed description when considered in connection with the accompaning drawings, wherein.

DESCRIPTION OF THE PREFERRED EMBODIMENTS

Figure 1:
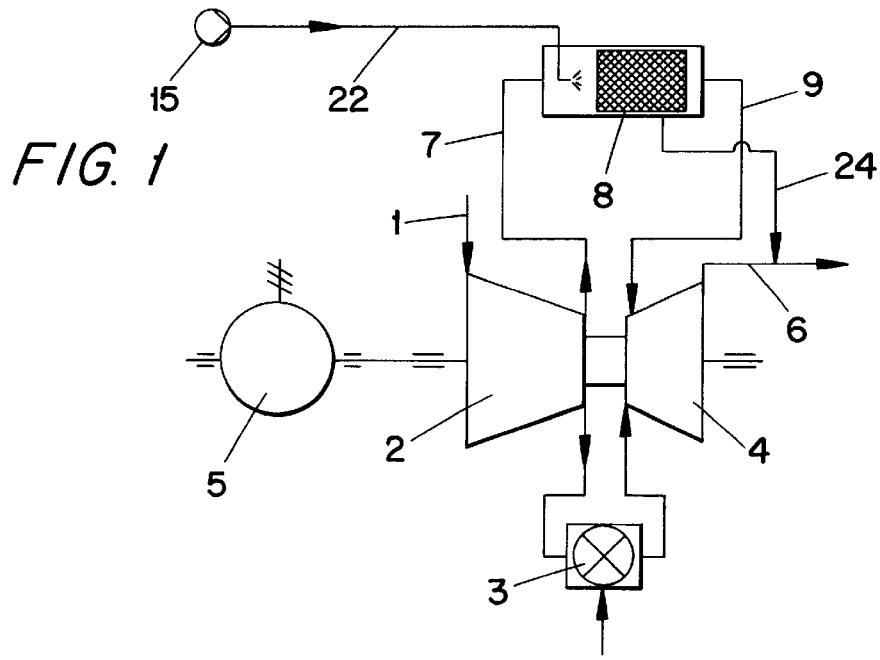
FIG. 1 shows a simplified scheme of a gas-turbine plant.

Referring now to the drawings, wherein like reference numerals designate identical or corresponding parts throughout the several views, only the elements essential for understanding the invention are shown, and the direction of flow of the working media is designated by arrows, in FIG. 1 fresh air drawn in atmospherically at 1 is compressed to the working pressure in a compressor 2 in the gas-turbine cycle. The compressed air is greatly heated in a combustion chamber 3, fired for example with natural gas; the fuel gas thus developing is expanded in a gas turbine 4 to perform work. The energy obtained in the process is delivered to a generator 5 or the compressor 2. The exhaust gases from the gas turbine are passed into the open via the exhaust-gas line 6 and a flue (not shown).

For the air required for cooling purposes, an air line 7 branches off from the outlet of the compressor 2 to a quench cooler 8. After it flows through the latter, the cooled air passes via a cooling line 9 to the various consumers. On the water side, the quench cooler is fed via the line 22 by a water pump 15.

Figure 2:
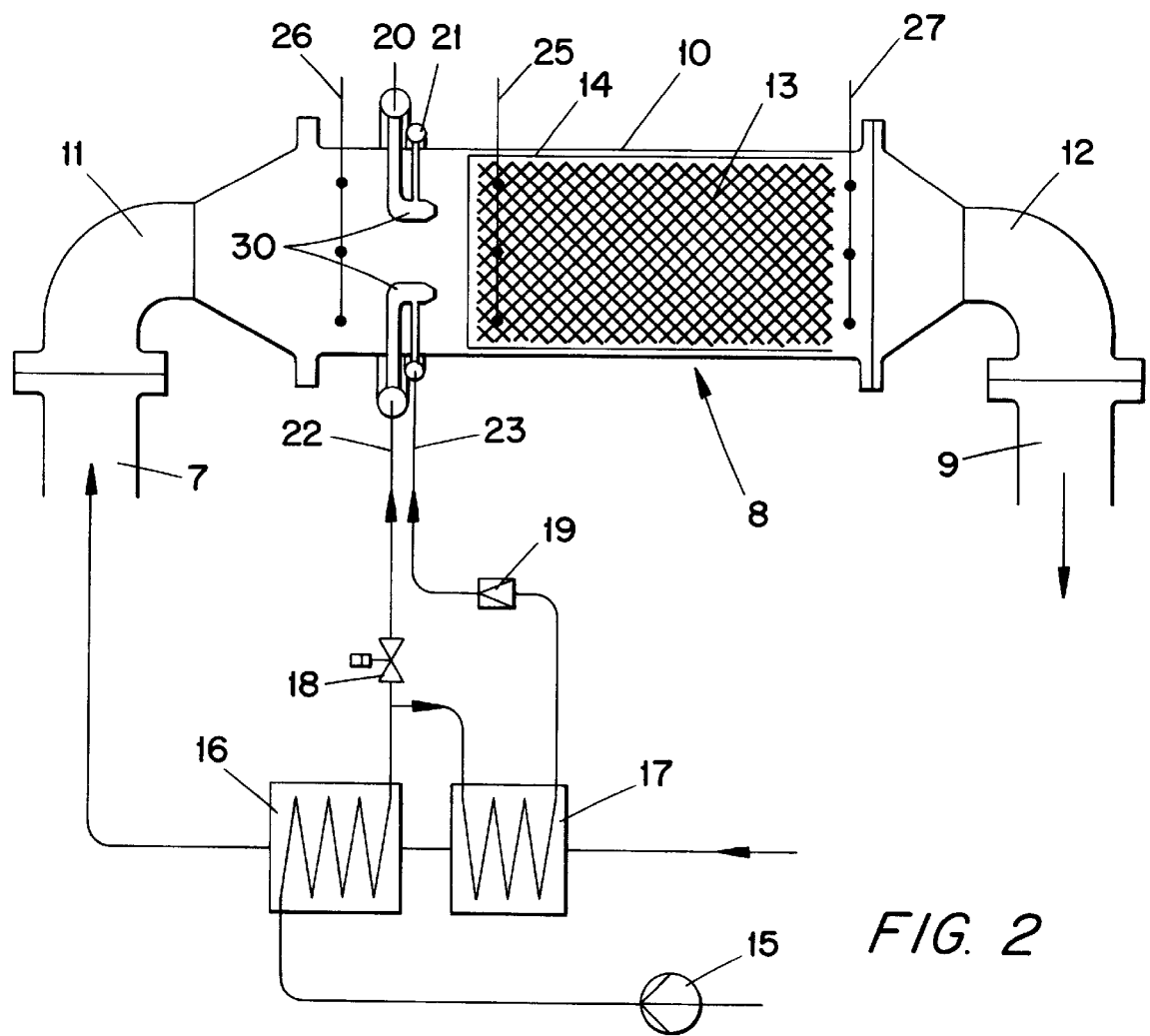
FIG. 2 shows a section through a quench cooler having an injection and monitoring system.

This quench cooler 8 is explained in more detail with reference to FIG. 2: the medium to be cooled passes into the apparatus via the hot-gas line 7—here the air line from the compressor. The apparatus essentially comprises the gas-inlet connection piece 11, which on the one hand is flanged to the air line 7 and on the other hand is connected via a flange to the cylindrical shell 10. On the outlet side, this shell 10 is in turn connected via a flange to the gas-outlet connection piece 12, which is also flanged to the cold-gas line 9—here the cooling line.

The water-injection means are arranged at the shell inlet in a distributed manner over the circular cross-section. These water-injection means comprise a plurality of pressure-atomization nozzles 30. They are fed on the one hand with water from an annular chamber 20 surrounding the apparatus and on the other hand with steam from an annular chamber 21 surrounding the apparatus. The steam serves to atomize the water, droplets of micron size being obtained at the nozzle outlet.

The preparation of the steam for the water atomization in the water-injection means 30 expediently takes place in the hot-gas line, here that is in the air line 7, which leads from the compressor to the quench cooler 8. The working medium first of all passes via the water pump 15 into a water preheater 16. From here, most of the water is directed via the water line 22 to the annular chamber 20. A control valve 18 is arranged in this water line 22. Some of the water is diverted at the outlet of the preheater and passed into the water evaporator 17. This water evaporator is connected in the hot-gas line on the air side upstream of the preheater. The generated steam passes from the evaporator into the annular chamber 21 via a steam line 23, in which a pressure-keeping valve 19 is arranged.

Downstream of the pressure-atomization nozzles 30, the circular cross-section of the shell 10 through which flow occurs is provided with a static mixer in the form of a packed column 13. Such a cylindrical column 13 contains layered packing material, called packing below. In this case, the packing may be a filling, that is a so-called random packing. More suitable is a regular packing, which offers the advantages of a higher mixing capacity at a smaller pressure drop due to specific homogeneous distribution. Suitable materials for such packings known per se are high-grade steel or ceramics, which are all distinguished by good wettability in aqueous systems.

The injected water and the air flow through the plurality of layers of the regular packing in a uniflow current. Complete intermixing of the two phases takes place in the packing, in the course of which the water portion vaporizes. In the process, the hot air delivers the enthalpy of vaporization, so that an isenthalpic lowering of the air temperature in the apparatus is effected.

This may be explained in more detail with reference to a numerical example: it goes without saying that absolute values cannot be specified in connection with the said numerical values with regard to the dimensioning of the apparatus and in particular the requisite packing length, since absolute values are in any case not meaningful enough on account of their dependence on all too numerous parameters. The sole determining factor for the design is that complete vaporization of the injected water takes place.

Let the inlet state of the air to be cooled be about 34 bar and about 500° C.; let the air quantity be about 35 kg/sec. The injected water quantity is about 10 kg/s. Via the air-outlet connection piece 12, the working medium then leaves the apparatus as cooling air at a temperature of about 170° C. In the present case, the air is accordingly a cooled down by 330° C.

Such an apparatus is distinguished by a compact type of construction and works without appreciable pressure losses. The compactness and the only short lines required enable the quench cooler to be set up directly next to the machine, so that it can be advantageously included in the sound insulation of the thermal block.

On account of the quench cooling, the output of the gas turbine is increased owing to the fact that the mass flow admitted to the gas turbine is at least partly increased by the vaporized water portion; this is because the cooling medium continues to be used to perform work in the gas-turbine blading after it performs its cooling function.

The packing is held in the column in a separate casing 14 in the form of thin sheet and is thus designed as a cartridge which can be pushed into the cylindrical shell 10. This has the advantage that residues of vaporization cannot settle on the actual apparatus shell 10. When the column is being dismantled during maintenance, the residues of vaporization which form a layer therefore remain inside the cartridge. The risk of particles breaking off from the shell wall 10 and of their possible transport into the consumers to be cooled is thus eliminated.

A cooling-air flow leading into the hot part of the gas turbine must not contain any water droplets, since these may lead to damage upon striking the hot parts. If water is found in the cooling-air flow, the machine must be shut down. Water-detection means for the existing high pressure and temperature ratios in modern gas turbines are at present not obtainable on the market. A temperature measurement in the static mixer itself provides a remedy here, for which purpose a plurality of appropriately connected thermocouples 25 are arranged in the interior of the packing. As water strikes the walls of the packing material, the temperature of the latter drops quickly. If the water flow is large enough, the temperature of the packing will drop to the wet-steam temperature. Such a measurement is therefore suitable for detecting in the shortest time water which strikes the packing material.

A further method of checking for the presence of water and its vaporization in the column is to measure the temperature upstream of and downstream of the static mixer. To this end, corresponding thermocouples 26 and 27 are passed through the shell 10 in a suitable manner and are suitably distributed in the cross-section through which flow occurs. The detection of a temperature difference between inlet and outlet of the mixer indicates proper vaporization.

Any condensate collecting in the quench cooler is directed via a drainage line 24 into the exhaust-gas line 6 leading to the flue. Conventional flashboxes, in which the condensate under pressure is expanded to atmospheric pressure and cooled down by mixing with cold water, are dispensed with by this measure.

The invention is of course not restricted to the exemplary embodiment shown and described. The novel apparatus concept can in principle be used in all processes in which the working media involved have high temperatures and even high pressures.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A quench cooler for cooling a hot flowing gas, essentially comprising a cylindrical shell which is connected via a gas-inlet connection piece to a hot-gas line and via a gas-outlet connection piece to a cold-gas line and which has means for injecting water, wherein a packed column filling the cross-section of the shell through which flow occurs is arranged downstream of the water-injection means wherein the packed column is designed as a cartridge which can be pushed into the cylindrical shell and has a separate casing.

2. A quench cooler for cooling a hot flowing gas, essentially comprising a cylindrical shell which is connected via a gas-inlet connection piece to a hot-gas line and via a gas-outlet connection piece to a cold-gas line and which has means for injecting water, wherein a packed column filling the cross-section of the shell through which flow occurs is arranged downstream of the water-injection means, and wherein the packed column is provided with thermocouples.

3. A quench cooler for cooling a hot flowing gas, essentially comprising a cylindrical shell which is connected via a gas-inlet connection piece to a hot-gas line and via a gas-outlet connection piece to a cold-gas line and which has means for injecting water, wherein a packed column filling the cross-section of the shell through which flow occurs is arranged downstream of the water-injection means, and wherein thermocouples are arranged upstream of and downstream of the packed column in the shell cross-section through which flow occurs.

4. A quench cooler for cooling a hot flowing gas, essentially comprising a cylindrical shell which is connected via a gas-inlet connection piece to a hot-gas line and via a gas-outlet connection piece to a cold-gas line and which has means for injecting water, wherein a packed column filling the cross-section of the shell through which flow occurs is arranged downstream of the water-injection means and wherein the water-injection means are pressure-atomization nozzles to which water and steam are admitted.

5. A quench cooler for cooling a hot flowing gas, essentially comprising a cylindrical shell which is connected via a gas-inlet connection piece to a hot-gas line and via a gas-outlet connection piece to a cold-gas line and which has means for injecting water, wherein a packed column filling the cross-section of the shell through which flow occurs is arranged downstream of the water-injection means, wherein the water-injection means are pressure-atomization nozzles to which water and steam are admitted, and wherein the steam is generated in an evaporator which is arranged in the hot-air line.

\* \* \* \* \*